May 1, 1928. 1,667,973

R. KIRCHER

HANDLE FOR KITCHEN UTENSILS

Filed July 18, 1923

Inventor:
Ralph Kircher,
By Sprinkle & Smith
Attys.

Patented May 1, 1928.

1,667,973

UNITED STATES PATENT OFFICE.

RALPH KIRCHER, OF WEST BEND, WISCONSIN, ASSIGNOR TO WEST BEND ALUMINUM COMPANY, A CORPORATION OF WISCONSIN.

HANDLE FOR KITCHEN UTENSILS.

Application filed July 18, 1923. Serial No. 652,258.

This invention relates to kitchen utensils, and more particularly to a detachable handle for a utensil.

One of the objects of the present invention is to provide a simple and economically constructed detachable handle, which can be quickly attached to or detached from a utensil.

A further object of the invention is to provide a strong and durable detachable handle, and one which is so constructed as to preclude the possibility of crushing the side of the utensil to which the handle is attached.

A further object of the invention is to provide a detachable handle having both ends adapted to be connected to various utensils in such a manner that the handle may assume different angles with respect to the utensils when connected to the same.

A further object of the invention is to provide a detachable handle formed from a single piece of flat metal.

A further object of the invention is to provide a detachable handle which is adapted to fit various utensils, and thereby eliminate the storage space necessary to store utensils with permanent or fixed handles.

A still further object of the invention is to provide a detachable handle by means of which heated utensils may be removed without fear of burning the hands, as commonly experienced by the housewife with utensils having permanently secured handles.

These and other objects are obtained by providing the construction of a detachable handle by means of which the handle may be quickly attached to utensils of various sizes and shapes, and be used with the utensil with as great a security as if the handle were permanently secured to the utensil.

Referring to the drawings—

Figure 1:
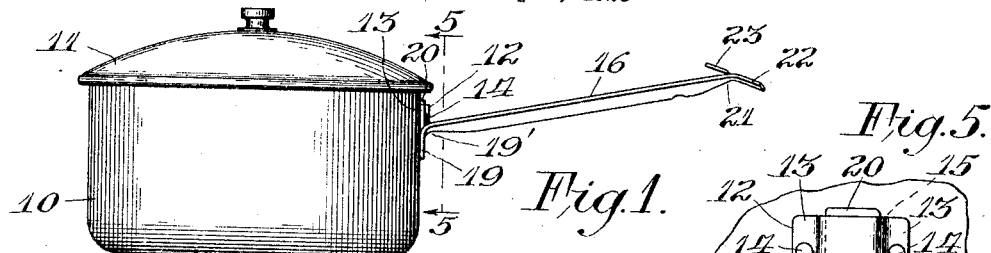
Figure 1 is a side elevational view of a relatively shallow kitchen utensil showing the manner in which my improved detachable handle is connected thereto.
Figure 5:
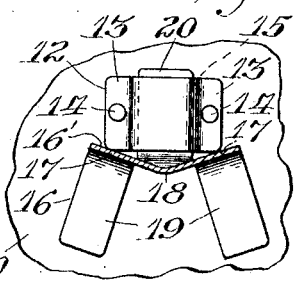
Fig. 5 is a cross-sectional view taken on the lines 5—5 in Fig. 1 looking in the direction of the arrows, and showing only a portion of the utensil.

In describing and illustrating my improved detachable handle, I have shown the same used in connection with a relatively shallow utensil 10, which is preferably round in shape and provided with a cover 11. Secured to one side of the utensil 10, and preferably positioned adjacent the upper portion thereof, is a recessed bracket 12. The bracket 12 has its outer ends 13 secured to the side of the utensil 10 in any well known manner, but preferably by rivets 14. The bracket 12 is so constructed when secured to the side of the utensil 10 as to form a slot or recess 15 between the bracket and the side of the utensil for the purpose hereinafter set forth.

Figure 7:
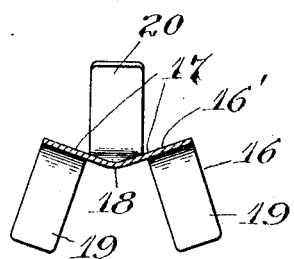
Fig. 7 is a cross-sectional view taken on the line 7—7 of Fig. 3 looking in the direction the arrows indicate.
Figure 4:
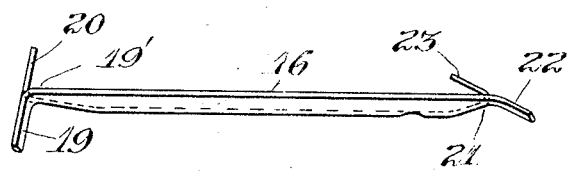
Fig. 4 is a side elevational view of Fig. 3.

My improved detachable handle 16 is preferably made of a single piece of relatively thin metal, as shown at 16', which is bent in its longitudinal dimension so as to form substantially a V-shaped construction in cross-section, as shown at 17 in Fig. 7, with the sides of the V relatively low with respect to the apex 18 of the V. The purpose of thus bending the handle in its V-shape is: First, to give it strength and thus permit the use of relatively light material in the construction of this handle; and, second, to spread or diverge the deflecting arms hereinafter described so that these arms spread over a substantial area of the side of the utensil, and thereby distribute the crushing effect caused by the leverage exerted on this part of the utensil.

Positioned on the opposite ends of my detachable handle 16 are means for detachably securing the handle to the bracket 12 of the utensil 10. The means on one end 19' of the utensil comprises a plurality of diverging handle comprises a plurality of diverging arms or tongues 19, which are formed as a continuation of the outer edges of the handle proper. Disposed on the side opposite the arms 19 is a single tongue 20. The tongue 20 extends outwardly from the central body portion of the handle 16. The arms 19 and tongue 20 are angularly disposed with respect to the handle portion 16, and these arms and tongue portion are in substantial transverse alignment with respect to each other and assume an angle with respect to the handle or substantially 90 degrees. The other end 21 of the handle 16 is similarly formed, and has two outwardly diverging arms 22, which form a continuation of the outer edges of the handle 16 and an intermediate upwardly bent tongue 23. The tongue 23 and arms 22 are in substantial parallel alignment with respect to each other, and are positioned with respect to the handle 16 in such a manner that the tongue 23 forms substantially an acute angle with the handle 16.

Figure 2:
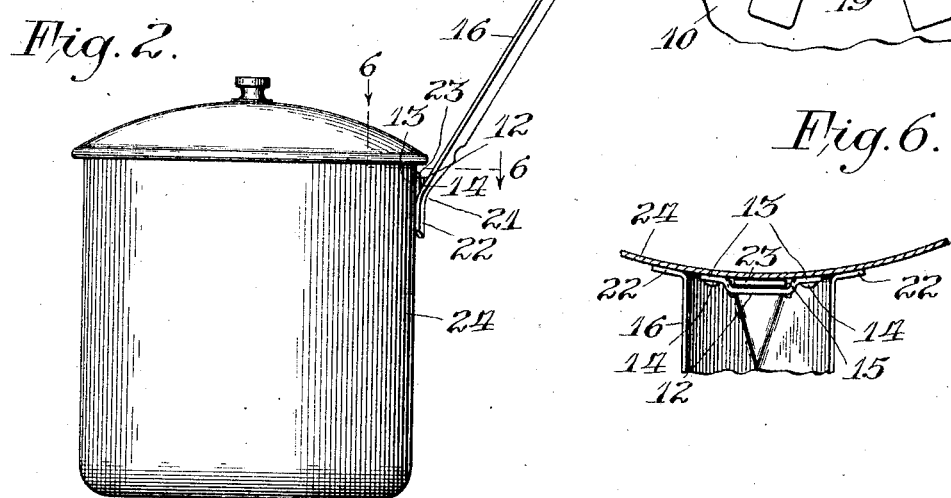
Fig. 2 is a side elevational view of a relatively deep kitchen utensil showing the manner in which my improved detachable handle is connected thereto with the handle positioned at a different angle with respect to the utensil than that shown in Fig. 1.

The object of this angular construction is to permit the handle to assume a relatively small angle with respect to the vertical when the handle is attached to a relatively deep utensil, as shown at 24, the purpose of this being to give the handle greater leverage in supporting or lifting a relatively heavy or deep utensil. In other words, when a relatively shallow or light utensil is to be removed or lifted by the detachable handle, the detachable handle 16 is positioned so that the end 19' of the handle 16 is connected to the bracket 12, with the tongue 20 inserted from beneath, in the recess 15 formed between the bracket 12 and the side of the utensil 10, and when the handle is thus connected it will assume an angle slightly above the horizontal plane, as clearly shown in Figure 1, and when the handle is used in connection with a deep or heavy utensil the end 21 is connected to the bracket 12 of the utensil 24 by inserting the tongue 23 from beneath the bracket 12 into the recess 15 formed between the bracket 12 and the utensil 24, and when the handle is thus connected it will assume a slight angle with respect to the vertical, as clearly shown in Fig. 2.

In each of these cases it will be noted that the downwardly diverging arms 19 and 22 on the opposite ends 19' and 21 respectively will contact with a large area of the sides of the utensil 10 or 24 in such a manner that the possibility of crushing the side of the utensil is entirely eliminated. When either of the tongues 20 or 23 of the handle 16 is connected to the bracket 12 of the respective utensil 10 or 24 there is sufficient friction between either of these tongues to frictionally support the handle in its engaging position so that it requires a slight pressure downwardly to disengage these handles when it becomes necessary to detach the handle from the utensil to which it was connected.

Figure 6:
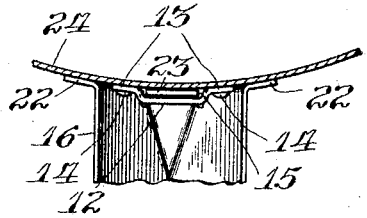
Fig. 6 is a cross-sectional view taken on the line 6—6 of Fig. 2 looking in the direction the arrows indicate.
Figure 3:
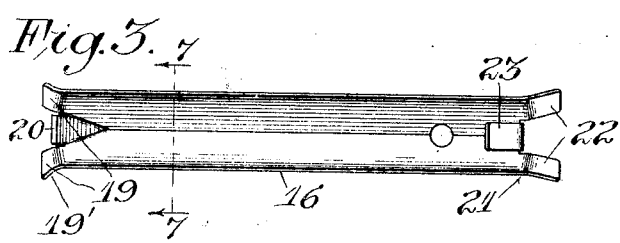
Fig. 3 is an enlarged top plan view of my improved detachable handle.

It will be further noted that the downwardly diverging arms 19 and 22 are so formed or curved as to conform to the curvature of the receptacle, as clearly shown in Fig. 6. This insures contacting of the complete surfaces of each of these arms against the sides of the utensil.

From the above description and illustration it will be seen that I have provided a very strong and efficient detachable handle, and one which can be easily and readily connected to or disconnected from the utensil. It will also be seen that the handle is capable of being attached to or used in connection with utensils of sizes and shapes other than those illustrated.

While in the above specification I have described one form of my invention, it will, of course, be understood that the same is capable of modification, and that modification may be employed without departing from the spirit and scope of the invention as expressed in the following claims.

What I claim as my invention and desire to secure by Letters Patent is:

1. A detachable handle for a utensil comprising a single piece of flat metal formed substantially V-shaped in cross section having a plurality of spaced apart diverging utensil engaging portions formed adjacent the sides of said handle at the ends thereof, said portions being bent at an angle to the longitudinal planes of the respective legs of said V-shaped formation, and a portion at each end of the handle intermediate said diverging portions formed in substantially the same planes, as, but being oppositely disposed with respect to said diverging portions for detachably connecting said handle to a utensil.

2. A detachable handle for a utensil comprising a single piece of metal formed substantially V-shaped in cross section having a plurality of pairs of diverging utensil engaging portions formed adjacent the sides of said handle at the opposite ends thereof, said portions being bent at an angle to the longitudinal planes of the respective legs of the said V-shaped formation, and a portion at each end of the handle intermediate the respective pairs of diverging portions formed in substantially the same planes as, but being oppositely disposed with respect to, said respective pairs of diverging portions, the intermediate portion and respective diverging portions at one end of the handle being disposed at a different angle from those at the opposite end of the handle with respect to the longitudinal line thereof.

In testimony whereof I have signed my name to this specification on this 12th day of July, A. D. 1923.

RALPH KIRCHER.